US009912265B2

(12) United States Patent
Stolt

(10) Patent No.: US 9,912,265 B2
(45) Date of Patent: Mar. 6, 2018

(54) METHOD FOR CONTROLLING AN ALTERNATING CURRENT ELECTRIC MACHINE, AND A FREQUENCY CONVERTER

(71) Applicant: KONE Corporation, Helsinki (FI)

(72) Inventor: Lauri Stolt, Helsinki (FI)

(73) Assignee: Kone Corporation, Helsinki (FI)

( * ) Notice: Subject to any disclaimer, the term of this patent is extended or adjusted under 35 U.S.C. 154(b) by 279 days.

(21) Appl. No.: 14/601,979

(22) Filed: Jan. 21, 2015

(65) Prior Publication Data
US 2015/0229251 A1    Aug. 13, 2015

(30) Foreign Application Priority Data

Feb. 8, 2014    (EP) .................................... 14154401

(51) Int. Cl.
| | |
|---|---|
| H03K 5/00 | (2006.01) |
| H02P 6/10 | (2006.01) |
| H02P 29/50 | (2016.01) |
| H02P 6/06 | (2006.01) |

(52) U.S. Cl.
CPC ............... H02P 6/10 (2013.01); H02P 29/50 (2016.02); *H02P 6/06* (2013.01); *H02P 2209/07* (2013.01)

(58) Field of Classification Search
CPC .......... H02P 2209/07; H02P 6/10; H02P 6/06; H02P 6/14; H02P 6/08
USPC .................................................... 318/400.2
See application file for complete search history.

(56) References Cited

U.S. PATENT DOCUMENTS

| | | | | |
|---|---|---|---|---|
| 5,155,671 | A | * 10/1992 | Inaba ................... | H02M 5/4585 363/37 |
| 2007/0216343 | A1 | * 9/2007 | Rozman ................. | H02M 1/12 318/811 |
| 2013/0033907 | A1 | 2/2013 | Zhou et al. | |
| 2013/0314953 | A1 | * 11/2013 | Cuzner ............... | H02M 5/4585 363/37 |

FOREIGN PATENT DOCUMENTS

| | | |
|---|---|---|
| EP | 1 833 153 A2 | 9/2007 |
| EP | 1 953 907 A1 | 8/2008 |
| GB | 2 229 870 A | 10/1990 |

* cited by examiner

*Primary Examiner* — Kawing Chan
*Assistant Examiner* — Bradley Brown
(74) *Attorney, Agent, or Firm* — Birch, Stewart, Kolasch & Birch, LLP

(57) ABSTRACT

Invention is related to a method for controlling an alternating current electric machine with a frequency converter including a controllable machine bridge and a controllable line bridge, and a corresponding frequency converter. The method comprises calculating a line bridge control signal, controlling line current through the line bridge using the line bridge control signal, measuring or estimating rotor pole position of the electric machine, calculating a machine bridge control signal as a function of the rotor pole position, updating the machine bridge control signal when the rotor pole position changes, and controlling current of the electric machine through the machine bridge using the machine bridge control signal.

19 Claims, 3 Drawing Sheets

US 9,912,265 B2

METHOD FOR CONTROLLING AN ALTERNATING CURRENT ELECTRIC MACHINE, AND A FREQUENCY CONVERTER

FIELD OF THE INVENTION

The invention relates to a method for controlling an alternating current electric machine with a frequency converter, and a corresponding frequency converter. The alternating current electric machine may be an alternating current electric motor or an alternating current electric generator.

BACKGROUND OF THE INVENTION

Alternating current electric machines, such as motors and generators, may be operated with a frequency converter. Frequency converter may be connected between a power line and the electric machine. The power line may be further connected to a power grid. Frequency converter may include an inverter which provides variable voltage and variable frequency supply voltage to the windings of the alternating current electric machine. Frequency converter may also include a line bridge which supplies electric power to/from the power line.

When operating, a magnetic flux wave travels in a magnetic circuit inside the electric machine. Magnetic flux wave normally includes (sinusoidal) fundamental wave and also some harmonics. These harmonics may be caused by non-sinusoidal rotor magnetization, such as non-sinusoidal magnetic field of permanent magnets of a permanent magnet synchronous machine. Harmonics may also be caused by discrete placing of the windings, for example in electric machines having fractional slot concentrated winding. Permanent magnet synchronous machines having fractional slot concentrated windings are used nowadays in elevator drives and wind turbine generators, for example.

The harmonics of the alternating current electric machine may have effect that electrical power is supplied irregularly to/from the electric machine. Irregular supply of power further causes distortion in line current. Distortion in line current is unwanted, because it causes disturbances in the power grid, therefore having the effect that the capacity of the power grid is not used in the most efficient way.

SUMMARY OF THE INVENTION

The object of the invention is to introduce a solution for controlling an alternating current electric machine such that distortion in line current may be reduced. This object is achieved with a method according to claim 1 and a frequency converter according to claim 9. The preferred embodiments of the invention are described in the dependent claims.

An aspect of the invention is a method for controlling an alternating current electric machine with a frequency converter including a controllable machine bridge connected to the electric machine, and a controllable line bridge connected to a power line. The method comprises: calculating a line bridge control signal, controlling line current through the line bridge using the line bridge control signal, measuring or estimating rotor pole position of the electric machine, calculating a machine bridge control signal as a function of the rotor pole position, updating the machine bridge control signal when the rotor pole position changes, controlling current of the electric machine through the machine bridge using the machine bridge control signal, taking samples of the line current as a function of the concurrent rotor pole position of the electric machine to gather a first sampled data, determining from the first sampled data a compensation term for removing the harmonics caused by the electric machine, and including the compensation term in the line bridge control signal and/or the machine bridge control signal, and if the compensation term is included in the line bridge control signal, then controlling line current through the line bridge using the line bridge control signal including the compensation term, and if the compensation term is included in the machine bridge control signal, then controlling current of the electric machine through the machine bridge using the machine bridge control signal including the compensation term. In the disclosure the term "harmonics caused by the electric machine" means periodic harmonics resulting from harmonics of the electric machine, e.g. from non-sinusoidal rotor magnetization, such as non-sinusoidal magnetic field of permanent magnets of a permanent magnet synchronous machine or discrete placing of the windings of the electric machine, for example. The harmonics of the electric machine may cause periodic disturbance, such as torque ripple of electric machine, current distortion resulting from rotation of the electric machine and vibration/noise of the electric machine, among others.

Another aspect of the invention is a frequency converter comprising a machine bridge for controlling an alternating current electric machine, a line bridge for controlling line current, a power bus connecting the machine bridge and the line bridge, a machine bridge controller, which is configured to control current of the electric machine through the machine bridge calculating a machine bridge control signal, a line bridge controller, which is configured to control line current through the line bridge calculating a line bridge control signal, and a feedback channel for receiving rotor pole position of the electric machine, the feedback channel being connected to the machine bridge controller. The machine bridge controller is configured to calculate the machine bridge control signal as a function of the rotor pole position, and to update the machine bridge control signal when the rotor pole position changes. The feedback channel is further connected to the line bridge controller. The line bridge controller is configured to take samples of the line current as a function of the concurrent rotor pole position of the electric machine to gather a first sampled data. The line bridge controller is also configured to determine from the first sampled data a compensation term for removing the harmonics caused by the electric machine.

In prior art, the harmonic content of the electric machine had the effect that power was distributed irregularly from power line to the electric machine and from electric machine to the power line, therefore causing distortion in line current and further in power grid. However, according to the present invention, when the compensation term is used for controlling line current/current of the electric machine, it is possible to eliminate or at least reduce the effect of the harmonic content of the electric machine from the line current, and therefore the line current distortion/distortion in power grid may be reduced. This is because the determined compensation term includes information about harmonic content of the electric machine as a function of the rotor pole position. Further, when the compensation term is included in the machine bridge control signal, then it is also possible to reduce other effects caused by harmonics of electric machine, such as machine noise, vibration etc.

The invention is especially effective, because by means of compensation term it is also possible to reduce effect of harmonics having frequency higher than critical control frequency of the line bridge and the motor bridge, which effect could not otherwise be dealt with.

In the most preferred embodiment of the invention, the compensation term is included in the line bridge control signal.

In a preferred embodiment, the line bridge controller is configured to include the compensation term in the line bridge control signal, and the line bridge controller is configured to control line current through the line bridge using the line bridge control signal including the compensation term.

In a preferred embodiment, the line bridge controller is configured to send the compensation term to the machine bridge controller, and the machine bridge controller is configured to include the compensation term in the machine bridge control signal. The machine bridge controller is configured to control current of the electric machine through the machine bridge using the machine bridge control signal including the compensation term.

In a preferred embodiment, the line bridge controller comprises a memory. The line bridge controller is configured to store the compensation term in the memory as a function of the rotor pole position of the electric machine, and the line bridge controller is configured to update the line bridge control signal including the compensation term when the rotor pole position in the feedback channel changes.

In a preferred embodiment, the machine bridge controller comprises a memory. The machine bridge controller is configured to store the compensation term in the memory as a function of the rotor pole position of the electric machine, and the machine bridge controller is configured to update the machine bridge control signal including the compensation term when the rotor pole position in the feedback channel changes.

This means that only a minimum processing capacity is needed to recalculate the compensation term when the rotor pole position changes, which has the effect that compensation term can be updated with high frequency and therefore can be used for reducing high-frequency line current distortion.

In a preferred embodiment, further samples of the line current are taken to gather a second sampled data, an updated compensation term for removing the harmonics caused by the electric machine is determined from the first sampled data and the second sampled data, and the updated compensation term is included in the line bridge control signal/the machine bridge control signal. If the compensation term is included in the line bridge control signal, then line current is controlled through the line bridge using the line bridge control signal including the updated compensation term. If the compensation term is included in the machine bridge control signal, then current of the electric machine is controlled through the machine bridge using the machine bridge control signal including the updated compensation term. This means that compensation term may be updated (redetermined) regularly, therefore taking into account any changes caused by e.g. degradation of permanent magnets, variation in ambient temperature etc. Increasing the amount of sampled data by using combination of first and second sampled data also means that a compensation term with improved accuracy can be determined.

In a preferred embodiment, line current reference is calculated, and the line current reference is synchronized to line voltage with a phase-locked loop. The sampled data of the line current is indexed with the concurrent rotor pole position of the electric machine, the difference between current reference and the data item of the sampled data is calculated with the same rotor pole position, respectively, the calculated differences are indexed with the concurrent rotor pole position associated therewith, and the compensation term is determined based on the differences indexed.

In a preferred embodiment, line current is controlled by adjusting output voltage reference of the line bridge responsive to the difference between line current reference and measured line current, current of the electric machine is controlled by adjusting output voltage reference of the machine bridge responsive to the difference between current reference of the electric machine and measured current of the electric machine, and the compensation term is included to the output voltage reference of the line bridge and/or the output voltage reference of the machine bridge.

In a preferred embodiment, line bridge control signal is calculated in the line bridge controller, machine bridge control signal is calculated in the machine bridge controller, the compensation term is memorized in the line bridge controller and/or in the machine bridge controller as a function of the rotor pole position, change of the rotor pole position of the electric machine is measured or estimated, and the line bridge control signal/machine bridge control signal including the compensation term is updated when the rotor pole position changes.

In a preferred embodiment the alternating current electric machine is an alternating current motor.

In another preferred embodiment the alternating current electric machine is an alternating current generator.

Still another aspect of the invention is a method for controlling an alternating current electric machine with a frequency converter including a controllable machine bridge connected to the electric machine, and a controllable line bridge connected to a power line. The method comprises: calculating a line bridge control signal, controlling line current through the line bridge using the line bridge control signal, measuring or estimating rotor pole position of the electric machine, calculating a machine bridge control signal as a function of the rotor pole position, updating the machine bridge control signal when the rotor pole position changes, controlling current of the electric machine through the machine bridge using the machine bridge control signal, taking samples of the active power of the electric machine as a function of the concurrent rotor pole position of the electric machine to gather a first sampled data, determining from the first sampled data a compensation term for removing the harmonics caused by the electric machine, and including the compensation term in the line bridge control signal and/or the machine bridge control signal, and if the compensation term is included in the line bridge control signal, then controlling line current through the line bridge using the line bridge control signal including the compensation term, and if the compensation term is included in the machine bridge control signal, then controlling current of the electric machine through the machine bridge using the machine bridge control signal including the compensation term. Harmonics of the electric machine may cause periodic fluctuation to the active power of the electric machine. Therefore, by means of the compensation term it is possible to reduce effect caused by harmonics of the electric machine, such as line current distortion and noise of the electric machine.

The embodiments described hereinbefore may be used in any combination with each other, if not indicated otherwise. Several of at least two of the embodiments may be combined together to form a further embodiment. Any aspects of the invention may comprise at least one of the embodiments described hereinbefore.

The preceding summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

For the sake of intelligibility, in FIGS. 1-4 only those features are represented which are deemed necessary for understanding the invention. Therefore, for instance, certain components/functions which are widely known to be present in corresponding art may not be represented.

In the description same references are always used for same items.

Figure 1:
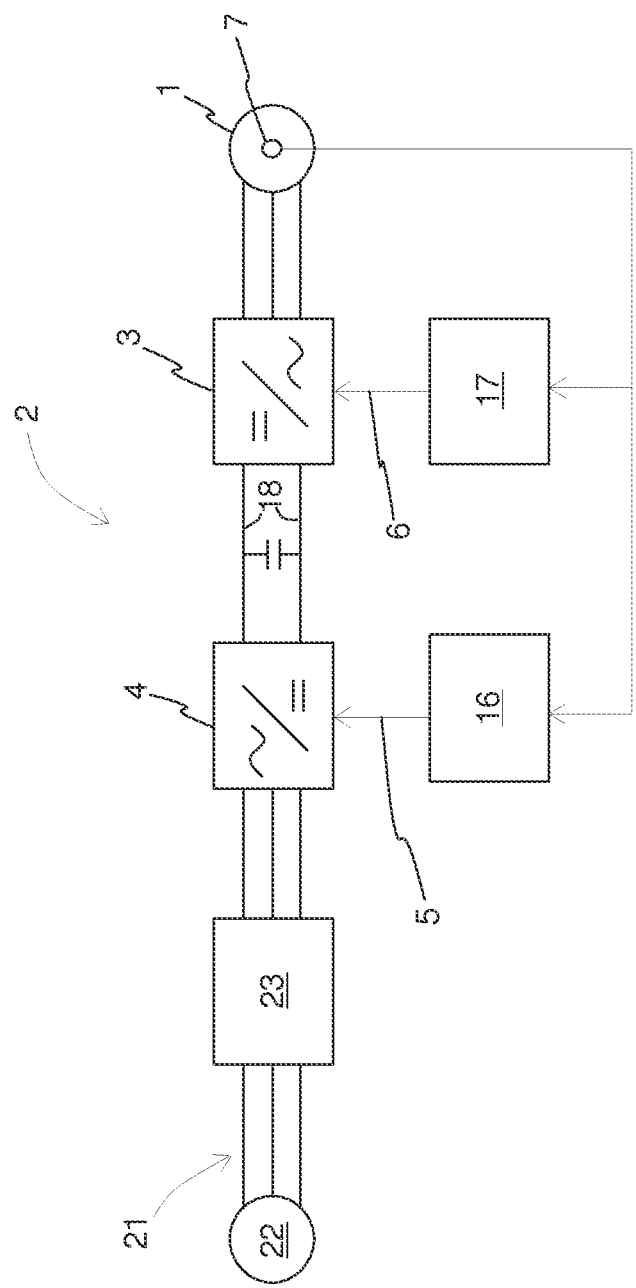
FIG. 1 presents a block diagram of a frequency converter according to an embodiment of the invention.

Frequency converter 2 of FIG. 1 comprises a machine bridge 3, which is connected to a 3-phase alternating current electric machine 1 for controlling the alternating current electric machine 1. Machine bridge 3 comprises igbt transistors (insulated gate bipolar transistors) arranged to a 2-level, 3-phase inverter configuration, as is known in the art. Machine bridge igbt transistors are operable to supply voltage of variable amplitude and frequency to the windings of electric machine 1. In one embodiment the alternating current electric machine 1 is a permanent magnet synchronous electric motor. In another embodiment the alternating current electric machine 1 is a permanent magnet synchronous generator.

Frequency converter 2 also includes a line bridge 4, which is connected to 3-phase power line 21 having a supply voltage, such as 50 Hz 230 V AC voltage, for example. The line bridge 4 is configured to control line current (that is, current in the power line 21). Power line 21 is further connected to power grid 22. The line bridge 4 also comprises igbt transistors arranged to a 2-level, 3-phase inverter configuration. The line bridge 4 is operable to synchronize 3-phase line current to the power line 21 supply voltage. Igbt transistors of both machine bridge 3 and line bridge 4 are switched with PWM modulation (pulse width modulation), having a switching frequency preferably between 3 KHz and 10 KHz. Therefore an additional current filter 23 with inductors is included in series with the power line 21 to filter line current. Instead of igbt transistors other suitable solid state switches may be used in main circuit of machine bridge 3 and/or line bridge 4. For example, silicon carbide (SiC) switches, such as silicon carbide igbt transistors or silicon carbide mosfet transistors may be used; in this case the switching frequency may preferably be increased, for example up to 20 KHz to suppress noise. Instead of 2-level inverter also other suitable main circuit configuration may be adopted in machine bridge and/or line bridge main circuit. For example, a 3-level 3-phase inverter configuration may be used. In some embodiments a different modulation method, such as space vector modulation, may be adopted instead of PWM modulation.

The machine bridge 3 and the line bridge 4 are connected together via a DC power bus 18. When driving, line bridge 4 supplies power from power line to the DC power bus 18, and machine bridge 3 supplies power further from the DC bus 18 to the electric machine 1. When regenerating (e.g. operating in generator mode), machine bridge supplies power from the electric machine 1 to the DC power bus 18, and line bridge 4 supplies power further from DC power bus 18 to the power line 21, correspondingly.

A machine bridge controller 17 is connected via control signal paths to the gates of the machine bridge igbt transistors. The machine bridge controller 17 is configured to calculate PWM control signals 6 of the igbt transistors, and to control current of the electric machine 1 through the machine bridge 3 with PWM modulation. Further, a line bridge controller 16 is connected via control signal paths to the gates of the line bridge igbt transistors. The line bridge controller 16 is configured to calculate PWM control signals 5 of the igbt transistors, and to control line current through the line bridge 4 with PWM modulation.

A feedback channel 7 is established for receiving rotor pole position $\theta$ of the electric machine 1. The rotor pole position $\theta$ means rotor pole position expressed in stator coordinates, as is known in the art. The feedback channel 7 comprises a pulse encoder, which provides a measuring signal indicative of rotor pole position $\theta$ of the electric machine 1 (so called absolute encoder) or a measuring signal indicative of change of rotor pole position $\theta$ of the electric machine 1 (so called incremental encoder). Signal line of the measuring signal is connected to the machine bridge controller 17 and the line bridge controller 16.

Alternatively, feedback channel 7 could be realized with an estimator, such as a flux estimator or emf estimator which estimates rotor pole position $\theta$ of the electric machine 1 by calculating an estimate of magnetic flux or emf (counter voltage) of the electric machine from currents and voltages of the electric machine 1, as is known in the art.

Figure 2:
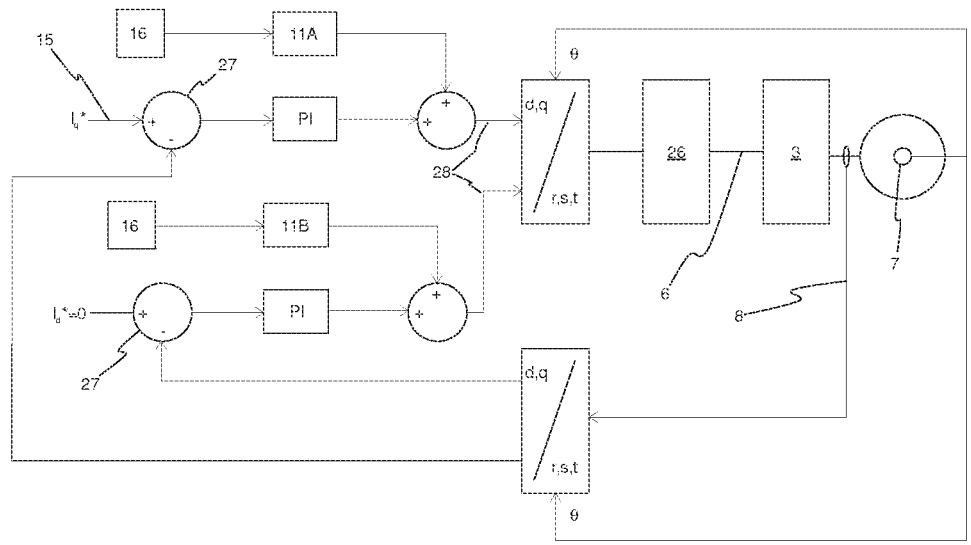
FIG. 2 illustrates a vector control loop of an alternating current electric machine.

FIG. 2 illustrates a vector control loop of the electric machine 1. The vector control loop is memorized in vector control software, which is operated in a DSP processor included in the machine bridge controller 17.

Velocity of the electric machine 1 is regulated in a velocity control loop. Velocity controller calculates torque reference 15 from the difference between velocity reference and measured velocity, and the voltage command 28 of the electric motor 1 is further calculated in current controller 27 from the difference between torque reference 15 and measured motor current 8. The control signals 5 of the machine bridge 3 igbt transistors are calculated from the voltage command 28 in PWM modulator 26. Control of the electric machine 1 is performed in rotating d, q, coordinate system, which is synchronized to the pole position of the electrical machine 1 via the feedback channel 7. Therefore, control parameters and signals of the vector control loop are calculated as a function of the rotor pole position $\theta$ obtained from the feedback channel 7.

Figure 3:
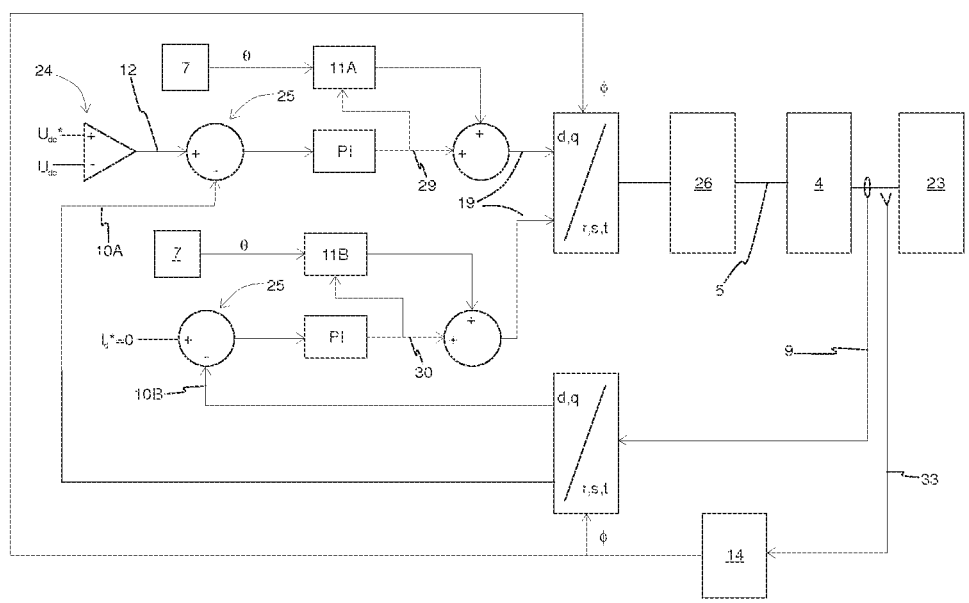
FIG. 3 illustrates a vector control loop of a modulating line bridge.

FIG. 3 illustrates a vector control loop of the line bridge 4. The vector control loop is memorized in vector control software, which is operated in a DSP processor included in the line bridge controller 16.

The DSP processor of the line bridge controller 16 is configured to calculate the PWM control signals 5 of the line bridge 4 igbt transistors based on calculations in DC bus voltage control loop 24 and line current control loop 25. DC bus voltage $U_{DC}$ is regulated by controlling line current 9. Preferably, DC bus target voltage is around 650V DC. First, line current reference 12 is calculated from difference between DC bus voltage reference $U_{DC}^*$ and measured DC bus voltage $U_{DC}$. Then voltage command 19 for the current filter 23 supply voltage 19 is calculated from the difference between line current reference 12 and measured line current 9. The control signals 5 of the line bridge igbt transistors are calculated from the voltage command 19 in PWM modulator 26. Control is performed in rotating d, q, coordination system, which is synchronized to the power line supply voltage 33 in phase locked loop 14. In other words, d, q coordinate system rotates as the phase angle φ of the power line supply voltage changes, which causes the rotation of the line current vector to be synchronized to the power line supply voltage.

The line bridge controller 16 takes samples of the line current 9 for current controller 25. d-axis 10B and q-axis 10A components of the sampled line current data are separated for d-axis current controller and q-axis current controller, respectively. In this embodiment, transformations from stator coordinates to d, q rotor coordinate system and backwards are done with Park and Clarke transformations, which transformations as such are known in the art.

Figure 4A:
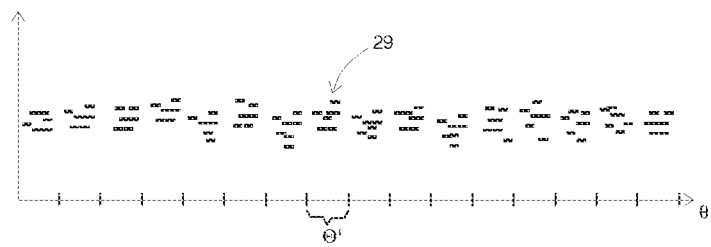
FIGS. 4a, 4b illustrate calculation of compensation term
Figure 4A:
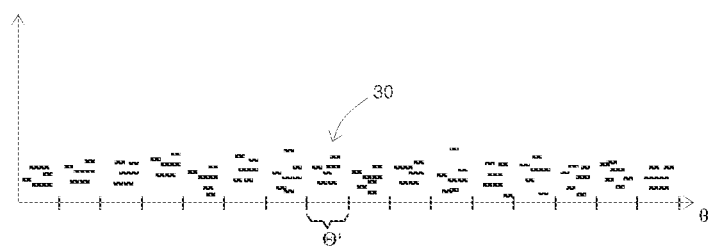
Figure 4B:
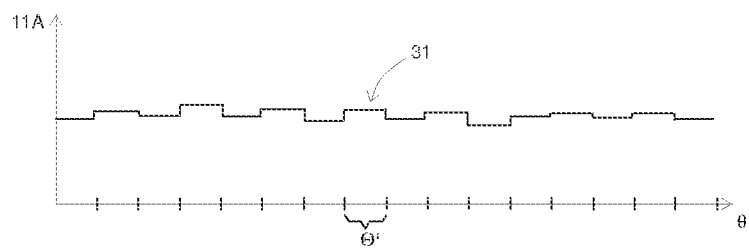
Figure 4B:
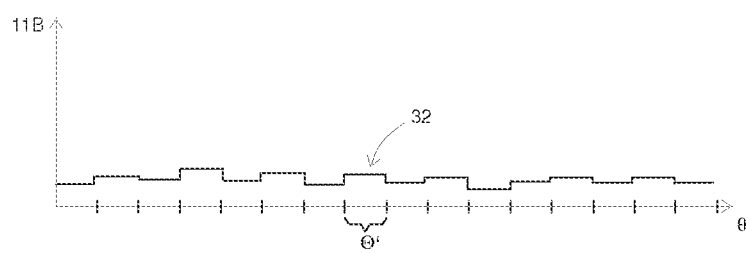

The DSP processor of the line bridge controller 16 further determines from sampled data 10A, 10B a compensation term 11A, 11B for removing the harmonics caused by the electric machine 1. For this purpose, DSP processor stores the output signal values 29, 30 calculated from the sampled data 10A, 10B in the current controllers into a memory, indexing them as a function of the concurrent electric angle θ of the electric machine 1. Separate tables are created for d- and q-axis current controller output signals, respectively. For each index value of rotor pole position θ a plurality of output signal values 29, 30 related to the concurrent index value θ' is collected (see FIG. 4a), and the final compensation term value 31, 32 (see FIG. 4b) is determined by filtering the consecutive output signal values 29, 30 with a low-pass filter to even out variation in the output signal values 29, 30. In FIG. 4b the term value 31 corresponds to the output signal values 29 and term value 32 corresponds to the output signal values 30.

The calculated/indexed compensation term value 31, 32 (11A, 11B) is further added to the current controller output value to obtain the voltage command 19. When the electric machine 1 rotates, a new electric angle value θ is received from the feedback channel 7, and the compensation term value 11A, 11B is updated accordingly. The determined compensation term 11A, 11B includes information about harmonic content of the electric machine as a function of the rotor pole position θ. This content can be separated from line current/current controller output value in the vector control loop of the line bridge, because desired line current is sinusoidal and therefore the deviations from the desired line current are easily obtainable.

Therefore, by including the compensation term 11A, 11B into the voltage command 19 it is possible to eliminate or at least reduce the effect of the harmonic content of the electric machine 1 from the line current.

In another embodiment the line bridge controller 16 sends the calculated compensation term 11A, 11B to the machine bridge controller 17 via a communication channel, and the compensation term 11A, 11B is added to the electric machine supply voltage reference 28 in the vector control loop of the electric machine 1. When the electric machine 1 rotates, the electric angle value θ changes, and the compensation term value 11A, 11B is updated accordingly. This way it is possible to reduce for example machine noise and vibration caused by the harmonic content of the electric machine.

The critical control frequency of the line bridge 4 and the motor bridge 3 is approximately 1 KHz, which critical frequency means the highest operating frequency of line bridge current controller/machine bridge current controller. However, by means of the compensation term 11A, 11B it is possible to reduce current distortion within frequency range over 1 KHz also.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method for controlling an alternating current electric machine with a frequency converter including a controllable machine bridge and a controllable line bridge, the method comprising:
   calculating a line bridge control signal,
   controlling line current through the line bridge using the line bridge control signal,
   measuring or estimating rotor pole position of the electric machine,
   calculating a machine bridge control signal as a function of the rotor pole position,
   updating the machine bridge control signal when the rotor pole position changes,
   controlling current of the electric machine through the machine bridge using the machine bridge control signal,
   taking multiple samples of the line current during a single rotation of the electric machine as a function of the concurrent rotor pole position of the electric machine to gather a first sampled data,
   determining from the first sampled data a compensation term for removing the harmonics caused by the electric machine, and including the compensation term in the machine bridge control signal, and
   controlling current of the electric machine through the machine bridge using the machine bridge control signal including the compensation term.

2. The method according to claim 1, wherein:
   determining the compensation term as a function of the rotor pole position,
   updating the line bridge control signal including the compensation term/the machine bridge control signal including the compensation term when the rotor pole position changes.

3. The method according to claim 1 or 2, wherein:
   taking further samples of the line current to gather a second sampled data
   determining from the first sampled data and the second sampled data an updated compensation term for removing the harmonics caused by the electric machine, and including the updated compensation term in the line bridge control signal/the machine bridge control signal,
   if the compensation term is included in the line bridge control signal, then controlling line current through the line bridge using the line bridge control signal including the updated compensation term,
   if the compensation term is included in the machine bridge control signal, then controlling current of the electric machine through the machine bridge using the machine bridge control signal including the updated compensation term.

4. The method according to claim 1, wherein:
calculating line current reference, and synchronizing the line current reference to line voltage with a phase-locked loop,
indexing the sampled data of the line current with the concurrent rotor pole position of the electric machine,
calculating the difference between current reference and the data item of the sampled data with the concurrent rotor pole position, respectively,
indexing the differences with the concurrent rotor pole position associated therewith,
determining the compensation term based on the differences indexed.

5. The method according to claim 1, wherein:
controlling line current by adjusting output voltage reference of the line bridge responsive to the difference between line current reference and measured line current,
controlling current of the electric machine by adjusting output voltage reference of the machine bridge responsive to the difference between current reference of the electric machine and measured current of the electric machine,
including the compensation term to the output voltage reference of the line bridge and/or the output voltage reference of the machine bridge.

6. The method according to claim 1, wherein:
calculating line bridge control signal in the line bridge controller
calculating machine bridge control signal in the machine bridge controller
memorizing the compensation term in the line bridge controller and/or in the machine bridge controller as a function of the concurrent rotor pole position
measuring or estimating change of the rotor pole position of the electric machine, and updating the line bridge control signal/machine bridge control signal including the compensation term when the rotor pole position changes.

7. The method according to claim 1, wherein the alternating current electric machine is an alternating current motor.

8. The method according to claim 1, wherein the alternating current electric machine is an alternating current generator.

9. A frequency converter comprising:
a machine bridge for controlling an alternating current electric machine;
a line bridge for controlling line current;
a power bus connecting the machine bridge and the line bridge;
a machine bridge controller, which is configured to control current of the electric machine through the machine bridge calculating a machine bridge control signal;
a line bridge controller, which is configured to control line current through the line bridge calculating a line bridge control signal;
a feedback channel for receiving rotor pole position of the electric machine, the feedback channel being connected to the machine bridge controller;
and the machine bridge controller being configured to calculate the machine bridge control signal as a function of the rotor pole position, and to update the machine bridge control signal when the rotor pole position changes,
wherein the feedback channel is connected to the line bridge controller;
and that the line bridge controller is configured to take multiple samples of the line current during a single rotation of the electric machine as a function of the concurrent rotor pole position of the electric machine to gather a first sampled data,
and that the line bridge controller is configured to determine from the first sampled data a compensation term for removing the harmonics caused by the electric machine.

10. The frequency converter according to claim 9, wherein the line bridge controller is configured to include the compensation term in the line bridge control signal,
and that the line bridge controller is configured to control line current through the line bridge using the line bridge control signal including the compensation term.

11. The frequency converter according to claim 9 or 10, wherein the line bridge controller is configured to send the compensation term to the machine bridge controller,
and that the machine bridge controller is configured to include the compensation term in the machine bridge control signal,
and that the machine bridge controller is configured to control current of the electric machine through the machine bridge using the machine bridge control signal including the compensation term.

12. The frequency converter according to claim 9, wherein the line bridge controller comprises a memory;
and that the line bridge controller is configured to store the compensation term in the memory as a function of the rotor pole position of the electric machine;
and that the line bridge controller is configured to update the line bridge control signal including the compensation term when the rotor pole position in the feedback channel changes.

13. The frequency converter according to claim 9, wherein the machine bridge controller comprises a memory;
and that the machine bridge controller is configured to store the compensation term in the memory as a function of the rotor pole position of the electric machine;
and that the machine bridge controller is configured to update the machine bridge control signal including the compensation term when the rotor pole position in the feedback channel changes.

14. The method according to claim 2, wherein:
calculating line current reference, and synchronizing the line current reference to line voltage with a phase-locked loop,
indexing the sampled data of the line current with the concurrent rotor pole position of the electric machine,
calculating the difference between current reference and the data item of the sampled data with the concurrent rotor pole position, respectively,
indexing the differences with the concurrent rotor pole position associated therewith,
determining the compensation term based on the differences indexed.

15. The method according to claim 3, wherein:
calculating line current reference, and synchronizing the line current reference to line voltage with a phase-locked loop,
indexing the sampled data of the line current with the concurrent rotor pole position of the electric machine,
calculating the difference between current reference and the data item of the sampled data with the concurrent rotor pole position, respectively,
indexing the differences with the concurrent rotor pole position associated therewith, determining the compensation term based on the differences indexed.

16. The method according to claim 2, wherein:
controlling line current by adjusting output voltage reference of the line bridge responsive to the difference between line current reference and measured line current,
controlling current of the electric machine by adjusting output voltage reference of the machine bridge responsive to the difference between current reference of the electric machine and measured current of the electric machine,
including the compensation term to the output voltage reference of the line bridge and/or the output voltage reference of the machine bridge.

17. The method according to claim 3, wherein:
controlling line current by adjusting output voltage reference of the line bridge responsive to the difference between line current reference and measured line current,
controlling current of the electric machine by adjusting output voltage reference of the machine bridge responsive to the difference between current reference of the electric machine and measured current of the electric machine,
including the compensation term to the output voltage reference of the line bridge and/or the output voltage reference of the machine bridge.

18. The method according to claim 4, wherein:
controlling line current by adjusting output voltage reference of the line bridge responsive to the difference between line current reference and measured line current,
controlling current of the electric machine by adjusting output voltage reference of the machine bridge responsive to the difference between current reference of the electric machine and measured current of the electric machine,
including the compensation term to the output voltage reference of the line bridge and/or the output voltage reference of the machine bridge.

19. A method for controlling an alternating current electric machine with a frequency converter including a controllable machine bridge and a controllable line bridge, the method comprising:
calculating a line bridge control signal,
controlling line current through the line bridge using the line bridge control signal,
measuring or estimating rotor pole position of the electric machine,
calculating a machine bridge control signal as a function of the rotor pole position,
updating the machine bridge control signal when the rotor pole position changes,
controlling current of the electric machine through the machine bridge using the machine bridge control signal,
for each rotation of the electric machine, taking plural samples of the line current as a function of the concurrent rotor pole position of the electric machine to gather a first sampled data,
determining from the first sampled data a compensation term for removing the harmonics caused by the electric machine, and including the compensation term in the line bridge control signal and/or the machine bridge control signal, the compensation term varying each rotation of the electric machine and being determined as a function of determined rotor pole position, and
if the compensation term is included in the line bridge control signal, then controlling line current through the line bridge using the line bridge control signal including the compensation term,
if the compensation term is included in the machine bridge control signal, then controlling current of the electric machine through the machine bridge using the machine bridge control signal including the compensation term.

* * * * *